G. W. BULLEY.
METHOD OF MIXING AND COMPOUNDING RUBBER.
APPLICATION FILED MAR. 15, 1917.
1,260,321. Patented Mar. 26, 1918.
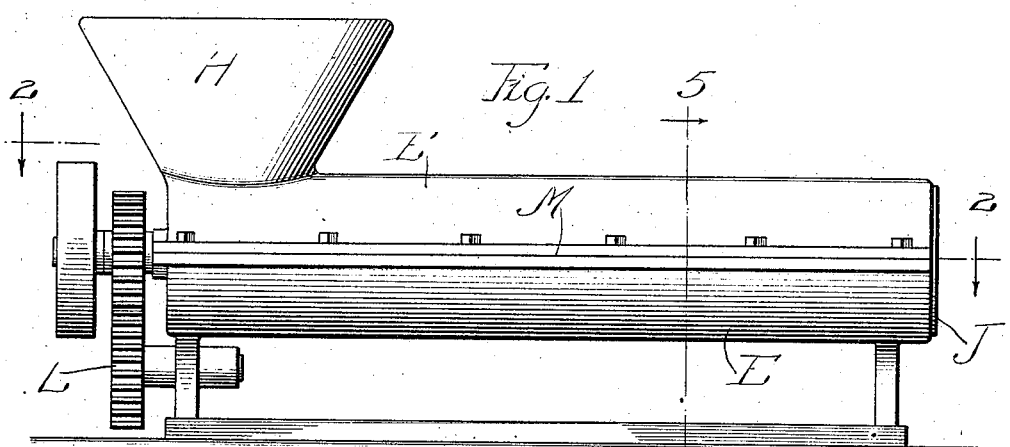
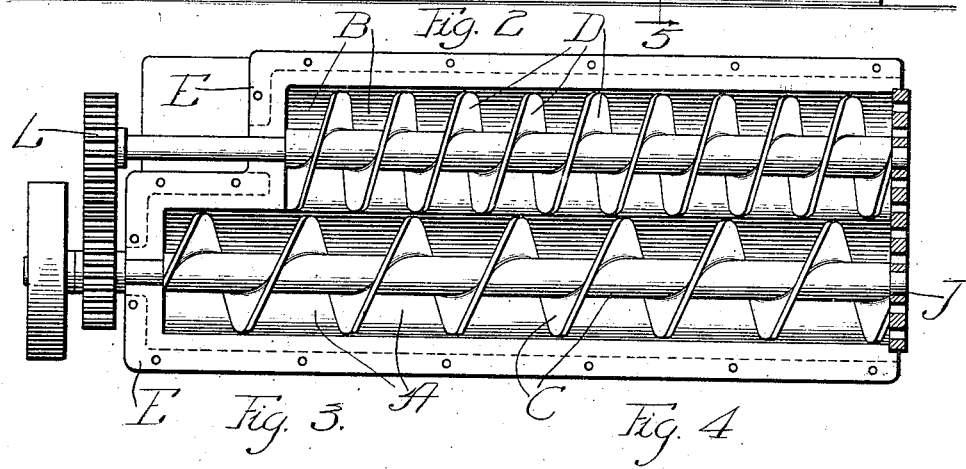
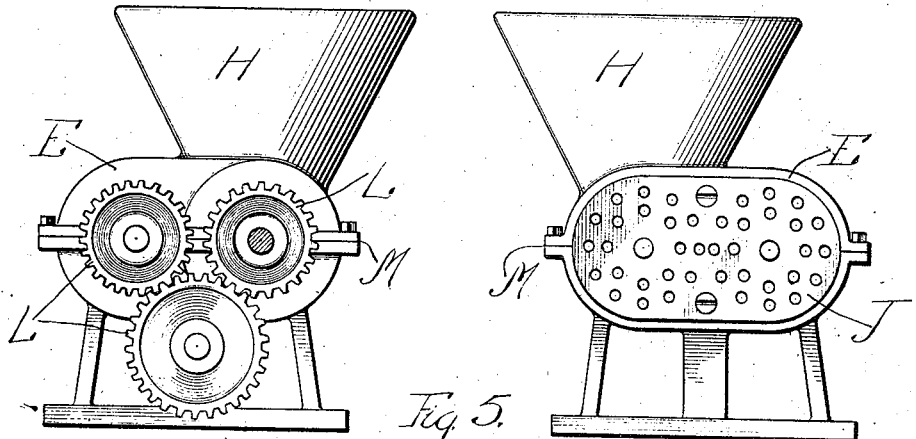
Witnesses:
Inventor:
George W. Bulley.

UNITED STATES PATENT OFFICE.

GEORGE W. BULLEY, OF CHICAGO, ILLINOIS.

METHOD OF MIXING AND COMPOUNDING RUBBER.

1,260,321.     Specification of Letters Patent.     Patented Mar. 26, 1918.

Application filed March 15, 1917. Serial No. 154,968.

*To all whom it may concern:*

Be it known that I, GEORGE W. BULLEY, a citizen of the United States of America, and resident of Chicago, Cook county, Illinois, have invented a certain new and useful Improvement in Methods of Mixing and Compounding Rubber, of which the following is a specification.

My invention relates to the art of mixing and compounding rubber, and my object is to provide an improved method by which to obtain a homogeneous mixture in which the compounding materials or ingredients are intimately mixed and uniformly disseminated throughout the mass.

It is the universal practice in mixing or "milling" rubber and compounding ingredients such as sulfur to manipulate the rubber by means of spaced rotating rolls between and around which the rubber is passed. During the course of this manipulation the operator manually sprinkles the compounds or ingredients over the mass of rubber in the rolls as well as he can. This distribution of the ingredients is more or less indiscriminate and indefinite and no special attempt at uniformity is made. It has, however, been found to be the only practical method of initially feeding or introducing the compounds to the mass because of the peculiar nature of rubber. This initial association of the ingredients with the rubber generally results in there being numerous areas and localities in the mass which consist entirely or almost entirely of the compounding materials in an unmixed state. On account of the peculiar nature of rubber the compounding materials must be literally squeezed or pressed into mixture or intimate association with the rubber. The operation of the "mill" or rolls above mentioned is such that the "pockets" or areas of compounding ingredients are, to a certain extent, manipulated or worked into the mass of rubber and even spread to some extent therein but these rolls do not bring portions of the mass into relation with remote portions; hence the manipulation is not effective from the standpoint of distribution and dissemination of the ingredients, and the non-uniformity of distribution still exists. Now in an attempt to overcome this difficulty, the operator, in the exercise of his skill, will occasionally cut away a portion of the mass and place the severed portion in another relative position in the mass, but these severed portions are large and contain in themselves the "pockets" or areas of unmixed compounding ingredients, hence the bodily shifting or transference of these large portions to another locality in the mass does not effect an infinite distribution, so to speak, of the infinite distribution, but on the contrary merely changes their relative location in the mass. Even repeated operations of this character does not uniformly distribute the ingredients and hence localities in the mass will be found to be richer in compounding ingredients than other localities. The eventual product or article is necessarily affected and unsatisfactory. Furthermore in this method there is constantly the danger of "over milling" the rubber—that is to say the amount or extent of manipulation necessary to obtain a passable mixture is likely to effect the properties of the rubber to such an extent as to vary the length of time and treatment in the vulcanizing or curing process which the particular batch is intended to require, and as a result the final product will not be according to standard.

My improved method eliminates these various objections and produces a thoroughly homogeneous mass in which the distribution of the compounds is infinite and uniform throughout the mass. I accomplish these results by more effectively directing and bringing about the distribution of the ingredients, and in carrying out my method I maintain a mass of rubber constantly progressing in a general direction at the same time adding rubber and compounding ingredients to the mass, increment by increment, either periodically or constantly, and all the while manipulating and triturating the mass during its progress. In addition to this action I bring about a complete interchange and intermixture of adjacent and remote portions of the progressing mass by shifting comparatively small portions to new and remote localities where the manipulation mixes them with each other and with the progressing mass and the increments added to the mass, these relatively shifting and changing portions being again and again sub-divided and the subdivision again distributed in the mass whereby the compounding ingredients are widely and uniformly disseminated throughout the mass.

In the accompanying drawings I show a mixing mill designed to carry out my improved method, the apparatus, as a mechanism, constituting the subject matter of a co-pending application Serial No. 153,834, filed March 10, 1917.

Referring to the drawings:

Figure 1 is a view in side elevation of a mixing machine for practising my method.

Fig. 2 is a plan view on the line 2—2 of Fig. 1 with the upper half of the casing removed.

Fig. 3 is a view of the feed end of the structure.

Fig. 4 is a view of the discharge end.

Fig. 5 is a transverse section on the line 5—5 of Fig. 1.

In the structure shown I provide two mixing and distributing members C and D in the form of spiral screws which I confine within tubular chambers or passages A and B formed in a suitable casing or housing E. These members and their chambers are preferably disposed longitudinally and in parallel relation, and the members are journaled in suitable bearings at the ends of the casing so that they are rotatable. The chambers are arranged to intersect along their sides to provide a continuous passage or line of communication therebetween and through which the material is passed from one screw to the other. The rubber is fed into the hopper H at one end of the casing, increment by increment, and is taken up by the mixing member C and progressed along the chamber, the action of the screw being to triturate and manipulate the mass as it progresses. The compounding materials are likewise fed into the hopper along with the rubber and are of course worked into intimate mixture with the rubber by the action of the screw. The screw, however, transfers or shifts portions of the mass to the other screw D which likewise manipulates the material and also re-transfers and shifts portions to the screw C, this operation taking place as the mass progresses toward the other end of the mixing chambers and consequently intermixing the portions. I bring about the distribution and redistribution of the portions of the mass by advancing or retarding portions of the progressing mass relatively to other portions, and in the structure shown this is accomplished by providing the mixing screws with threads or turns of different pitch running the same or at different speeds or threads of the same pitch and running at different speeds. The delaying or retarding of numerous comparatively small portions relatively to other portions re-arranges and re-distributes the portions and the ingredients in these portions are mixed with other portions in their new localities and divided and the sub-divisions associated with the sub-divisions of other portions and again distributed. The mass, as a whole, is progressing toward the discharge end of the chambers, where the screws force the material through a die J which consists of a plate covering the ends of the chambers and provided with a plurality of small holes. These die openings or holes comminute the material and even assist to an extent in the mixing of the material. The mixing members are driven at any suitable source through the medium of gears L at one end of the casing. The mixing members in this case have threads or turns of different pitch and are rotated at the same speed and in a direction to force the material through the die at the discharge end. The casing is preferably divided along a horizontal line M for the purpose of assembling and disassembling.

I claim:

1. In the art of mixing and compounding rubber, the method of producing a thoroughly homogeneous mixture which consists in differentially progressing a plurality of portions of a mass of rubber and compounds in the same general direction, individually manipulating the portions of said mass, relatively intermixing said portions by transferring material from each portion to the other.

2. In the art of mixing and compounding rubber, the method of producing a thoroughly homogeneous mixture which consists in dividing the mass of rubber and compounds into a plurality of streams, progressing said streams differentially in a general direction, and manipulating said streams individually relatively intermixing said streams by interchanging the material thereof and adding increments of rubber and compounding ingredients to the mass.

3. In the art of mixing rubber and compounds, the method of producing a thoroughly homogeneous mixture which consists differentially in moving a plurality of masses of the material, individually manipulating the masses as they are moving, and intermixing and manipulating the materials of the masses.

4. In the art of mixing rubber and compounds, the method of producing a homogeneous mixture which consists in individually manipulating a plurality of masses of the material and moving the masses differentially to shift the portions of the masses relatively to each other, intermixing the relatively shifted portions of each mass with the other, and manipulating the intermixed portions.

5. In the art of mixing rubber and compounds, the method of producing a homogeneous mixture which consists in individually manipulating a plurality of masses of the material and constantly moving the masses at different speeds and in intimate proximity, and causing the manipulation of each mass to shift relatively and intermix with portions of each other mass.

6. The method of mixing rubber and compounds which consists in individually manipulating a plurality of masses of the material in such close proximity that the manipulation thereof forces portions of one mass into the other mass, and moving the masses at different speeds.

7. The method of mixing rubber and compounds which consists in individually manipulating a plurality of masses of the material in such close proximity that the manipulation thereof forces portions of one mass into the other mass, and simultaneously progressing the masses in the same general direction but at different speeds.

Signed by me at Chicago, Illinois, this 5th day of March, 1917.

GEORGE W. BULLEY.